May 26, 1942.  W. V. THELANDER  2,284,349
CLUTCH PLATE ASSEMBLY
Filed Jan. 2, 1941  2 Sheets-Sheet 1

Inventor:
W. Vincent Thelander
By
McCanna, Wintercorn & Morsbach
Attys.

May 26, 1942.   W. V. THELANDER   2,284,349
CLUTCH PLATE ASSEMBLY
Filed Jan. 2, 1941   2 Sheets-Sheet 2
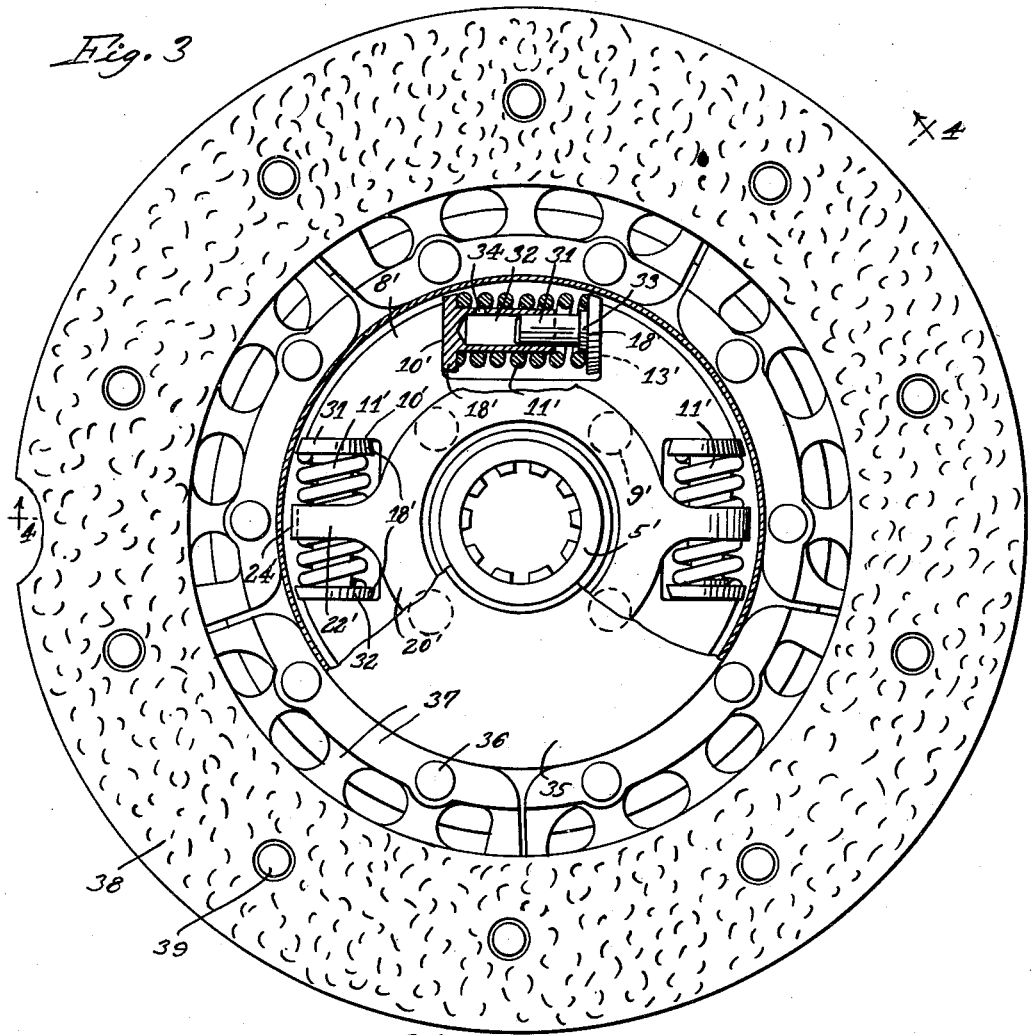
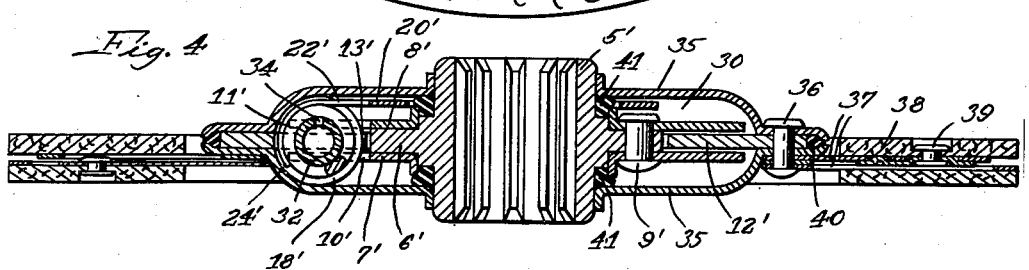

Patented May 26, 1942

2,284,349

UNITED STATES PATENT OFFICE 2,284,349

CLUTCH PLATE ASSEMBLY

W. Vincent Thelander, Rockford, Ill.

Application January 2, 1941, Serial No. 372,863

17 Claims. (Cl. 64—27)

This invention relates to motion transmitting elements and is more particularly concerned with improvements in automotive type friction clutch plates.

One of the most serious objections to spring cushioned clutch plates has been the rubbing of the coiled springs against the adjacent portions of the clutch plate in the relative movement between the driving and driven portions, the springs being thrown outwardly under centrifugal force into such contact. It is, therefore, the principal object of my invention to provide simple and novel means for retaining the springs in position in the plate.

A salient feature of the spring retainer of my invention lies in the fact that a single retainer rotatable about the axis of the plate in the direction of compression of the springs has radially extending fingers, each of which projects over the radially outer side of one of the springs at the middle thereof, thus holding all of the springs against outward movement under centrifugal force and preventing the rubbing action mentioned.

Another object of the invention consists in the provision of flat retainer rings on opposite sides of a plate in interlocked relation to one another and to the springs, the retainer rings serving not only to hold the springs against outward movement under centrifugal force to prevent the rubbing action mentioned but also serving by engagement with annular shoulders on the hub to prevent sidewise displacement of the springs from their assigned positions between the driving and driven portions of the plate.

Still another object of the invention consists in the provision of a flat ring form of retainer adapted to operate inside a fluid filled housing on the clutch plate, where fluid damping means is employed in conjunction with piston and cylinder devices in the several springs for fluid damping action, as first disclosed in my copending application, Serial No. 316,088, filed January 29, 1940, the retainer ring in such a plate serving to retain the springs as well as the piston and cylinder devices against outward movement under centrifugal force, whereby to avoid rubbing action of the springs as well as the piston and cylinder devices on the adjacent portions of the plate in the relative movement between the driving and driven portions.

The invention is illustrated in the accompanying drawings, in which—

Figure 1 is a side elevation of a clutch plate embodying my invention;

Fig. 2 is a section on the broken line 2—2 of Fig. 1;

Fig. 3 is a view partly in side elevation and partly in section of another clutch plate embodying my invention, and Fig. 4 is a section on the broken line 4—4 of Fig. 3.

Similar reference numerals are applied to corresponding parts in these views.

Referring first to Figs. 1 and 2, the reference numeral 5 designates the hub member which has an annular flange 6, on opposite sides of which two sheet metal rings 7 and 8 are riveted, as indicated at 9. These rings have a plurality of equally circumferentially spaced notches 10 provided therein, four in the present instance, one for each of a plurality of coiled compression springs 11, the notches 10 in the two rings being in register with one another. Another ring 12, the inner and outer peripheries of which are in concentric relation with the periphery of the flange 6, is disposed between the rings 7 and 8 and has notches 13 provided therein in register with the notches 10. In that way the springs 11 have engagement at one end with one end of the notches 10 and at the other end with the opposite end of the notches 13 in a manner well understood in this art. The ring 12 is riveted, as indicated at 14, to the disk 15 on which the usual friction rings or facings 16 are secured, as indicated at 17. Mushroom buttons having heads 18 of larger diameter than the springs and having reduced stem portions 19 fitting in the ends of the springs transmit torque from the ring 12 to one end of the springs and from the other end of the springs to the rings 7 and 8 on the hub 5, and besides insuring uniform cushioning action of the springs serve to space the ends of the springs from adjacent portions of the plate to avoid wear on the end coils.

The flat retainer rings 20 and 21 provided in accordance with my invention are of spring material and disposed on opposite sides of the plate, the ring 20 having radially extending fingers 22 in equally circumferentially spaced relation, one adjacent the middle portion of each of the springs 11, and the ring 21 having radially extending fingers 23 in register with the fingers 22. The fingers 22 are hook-shaped to extend part way around the radially outer side of the springs 11, as indicated at 24 in Fig. 2, and the fingers 23 are also hook-shaped and overlap the outer end portions of the fingers 22, as indicated at 25 in Fig. 2, whereby to interlock the fingers 22 and 23 so that the rings 20 and 21 move together as a unit to form a retaining cage for the entire set of springs 11 on the plate. The springs are thus held against outward movement under centrifugal force, so that there can be no rubbing action between the springs and the ring 12 nor even between the buttons 18 and the ring 12. The latter has the radially outer side 26 of all of the notches 13 struck on arcs concentric with the inner and outer peripheries of the ring 12 and in radially spaced relation to the buttons 18 and fingers 22 and 23, as clearly appears in Fig. 1, and since the springs and buttons are retained against outward movement under centrifugal force, it is manifest that no rubbing action can occur. In the compression of the springs 11, the retainer rings 20 and 21 rotate about the axis of the plate in the direction of compression, due to the engagement of the hook portions 24 of the fingers 22 with the middle portions of the springs, and, hence, the fingers 22 and 23 do not change their relationship to the springs. The fingers 22 will give radially outwardly enough to allow the ring 20 to be assembled over the springs 11, and the same is true regarding the fingers 23 in so far as their application over the fingers 22 is concerned. If desired, I may provide means to prevent rotary displacement of one of the rings 20 with respect to the other, as, for example, in the form of projections on the opposite sides of fingers 23 to engage opposite sides of the fingers 22 at the overlapping portions of said fingers. The two rings 20 and 21 are free to oscillate with respect to the hub 5 and are arranged to engage annular shoulders 27 on the hub to prevent axial displacement of the retainer rings relative to the hub and accordingly hold the springs 11 against sidewise displacement from the notches 10 and 13. In that way no other retaining means is required to hold the springs in position in the plate, although, if desired, one or both of the spring retainer rings 20 and 21 may be provided in conjunction with other spring retaining means, the fingers 22 and/or 23 functioning only to prevent radial displacement of the springs under centrifugal force, while the other retaining means functions only to prevent lateral displacement of the springs, the tendency toward lateral displacement increasing with the compression of the springs, as is well known in this art.

In the clutch plate shown in Figs. 3 and 4, there is a single flat spring retainer ring 20', the radially extending fingers 22' of which have hooked end portions 24' extending part way around the middle portions of the coiled compression springs 11' to prevent outward movement thereof under centrifugal force. Each of the springs 11' is assembled in a notch 10' provided in the rings 7' and 8', riveted as at 9' on the flange 6' of the hub 5'. Another ring 12' is provided between the rings 7' and 8' in concentric relation with the flange 6' and has notches 13' registering with the notches 10', similarly as in the construction of Figs. 1 and 2. However, this clutch plate differs from the one first described not only in the fact that there is only one spring retainer ring 20', but also in the fact that there is an annular chamber 30 around the hub 5' filled with heavy lubricating oil or grease and a piston 31 and cylinder 32 cooperating with each of the springs 11' in the registering notches 10' and 13', the piston and cylinder extending into the springs from opposite ends and being provided with enlarged circular head ends 18', larger in diameter than the springs so as to space the ends of the springs from adjacent portions of the plate. Each piston 31 has an annular shoulder 33 thereon at its outer end next to the head 18' of approximately the same outside diameter as the cylinder 32, so that both ends of the springs are centered alike with relation to the heads 18'. Each cylinder 32 has a bleeder hole 34 provided in the wall thereof to allow inflow and outflow of the heavy oil or grease in the reciprocation of the pistons and cylinders relative to one another incident to the expansion and compression of the springs 11' in the operation of the clutch plate, as fully set forth in my copending application, Serial No. 366,960, filed November 25, 1940. The spring retainer ring 20' in this construction by reason of its attachment to the springs 11' serves also to hold the piston and cylinder devices 31—32 against outward displacement under centrifugal force. The sheet metal housing plates 35 between which the annular chamber 30 is provided are secured to the outer marginal portion of the ring 12' by the rivets 36, which also serve to secure sheet metal stampings 37 to the ring 12'. The stampings have the annular facing rings 38 riveted thereon, as indicated at 39. The outer periphery of the housing formed by the plates 35 is sealed by a compressed rubber gasket ring 40 and the inner periphery is sealed by other compressed rubber gasket rings 41.

The operation of this clutch plate in so far as the functioning of the spring retainer ring 20' is concerned is substantially the same as the other clutch plate having spring retainer rings 20 and 21. The ring 20' takes up so little space that little or no enlargement of the housing around the hub 5' is required.

In both clutch plates herein disclosed, the fact that the compression springs 11 and 11' are protected against rubbing action makes for much more satisfactory operation over a long period of time. Where the springs are allowed to rub on adjacent portions of the plate, there is a weakening if not an actual breakage of one or more of the springs, depending upon the closeness of fit and the relationship of the parts in different plates.

It is believed the foregoing description conveys a good understanding of the objects and advantages of my invention. The appended claims have been drawn with a view to covering all legitimate modifications and adaptations.

I claim:

1. A motion transmitting element, comprising two overlapping members having registering openings therein in circumferentially spaced relation about the axis of rotation, coiled compression springs seated in said openings to resist relative rotation between said members, and a ring in concentric relation with said overlapping members and connected at circumferentially spaced points with the middle portions of said springs to retain the same against radially outward movement under centrifugal force.

2. A motion transmitting element, comprising two overlapping members having registering openings therein in circumferentially spaced relation about the axis of rotation, coiled compression springs seated in said openings to resist relative rotation between said members, and two rings in concentric relation with the overlapping members and disposed on opposite sides thereof, both connected at circumferentially spaced points with the middle portions of said springs to retain the same against radial and lateral displacement from the openings.

3. A motion transmitting element, comprising two overlapping members having registering openings therein in circumferentially spaced relation about the axis of rotation, coiled compression springs seated in said openings to resist relative rotation between said members, and a ring in concentric relation with but separate from and movable relative to said overlapping members having hook-shaped spring fingers thereon at circumferentially spaced points snapped over only the radially outer middle portions of the springs to retain the same against radial displacement under centrifugal force.

4. A motion transmitting element, comprising two overlapping members having registering openings therein in circumferentially spaced relation about the axis of rotation, coiled compression springs seated in said openings to resist relative rotation between said members, and a pair of rings in concentric relation with said members and disposed on opposite sides thereof, the one having hook-shaped spring fingers thereon at circumferentially spaced points snapped over the radially outer middle portions of the springs to retain the same against radial displacement under centrifugal force, and the other having hook-shaped spring fingers thereon in register with the first mentioned spring fingers and snapped over the outer ends thereof to interconnect the two rings and prevent lateral displacement of the springs from the openings.

5. A motion transmitting element, comprising two overlapping members having registering openings therein in circumferentially spaced relation about the axis of rotation, coiled compression springs seated in said openings to resist relative rotation between said members, and a ring in concentric relation with but separate from and movable relative to said overlapping members having hook-shaped fingers thereon at circumferentially spaced points projecting over only the radially outer middle portions of the springs to retain the same against radial displacement under centrifugal force.

6. A motion transmitting element, comprising two overlapping members having registering openings therein in circumferentially spaced relation about the axis of rotation, coiled compression springs seated in said openings to resist relative rotation between said members, and a pair of rings in concentric relation with said members and disposed on opposite sides thereof, the one having hook-shaped fingers thereon at circumferentially spaced points projecting over the radially outer middle portions of the springs to retain the same against radial displacement under centrifugal force, and the other having hook-shaped fingers thereon in register with the first mentioned fingers and projecting over the outer ends thereof to interconnect the two rings and prevent lateral displacement of the springs from the openings.

7. A motion transmitting element, comprising two overlapping members having registering openings therein in circumferentially spaced relation about the axis of rotation, coiled compression springs seated in said openings to resist relative rotation between said members, an interfitting piston and cylinder associated with each of said springs and normally held in extended relation to one another by the springs, the cylinders extending axially into the springs from one end and the pistons extending axially into the springs from the other end, the pistons and cylinders having enlarged substantially circular head portions on the outer ends thereof for abutment on the inner side thereof with the adjacent ends of the springs, and a ring in concentric relation with said overlapping members and connected at circumferentially spaced points with the middle portions of said springs to retain the same against radially outward movement under centrifugal force.

8. A rotary motion transmitting element, comprising relatively oscillatable inner and outer members, a plurality of coiled compression springs for resisting relative rotary movement between the inner and outer members, and a ring in concentric relation with said inner and outer members and connected at circumferentially spaced points with the middle portions of said springs to retain the same against radially outward movement under centrifugal force.

9. A rotary motion transmitting element, comprising relatively oscillatable inner and outer members, a plurality of coiled compression springs for resisting relative rotary movement between the inner and outer members, an interfitting piston and cylinder associated with each of said springs and normally held in extended relation to one another by the springs, the cylinders extending axially into the springs from one end and the pistons extending axially into the springs from the other end, the pistons and cylinders having enlarged substantially circular head portions on the outer ends thereof for abutment on the inner side thereof with the adjacent ends of the springs, and a ring in concentric relation with said inner and outer members and connected at circumferentially spaced points with the middle portions of said springs to retain the same against radially outward movement under centrifugal force.

10. A motion transmitting element comprising relatively oscillatable inner and outer members, a plurality of coiled compression springs for resisting relative rotary movement between the inner and outer members, an interfitting piston and cylinder associated with each of said springs and normally held in extended relation to one another by the springs, the cylinders extending axially into the springs from one end and the pistons extending axially into the springs from the other end, the pistons and cylinders having enlarged substantially circular head portions on the outer ends thereof for abutment on the inner side thereof with the adjacent ends of the springs, a ring in concentric relation with said inner and outer members and connected at circumferentially spaced points with the springs to retain the same against radially outward movement under centrifugal force, the outer member comprising a housing surrounding a portion of the inner member along with said springs and associated pistons and cylinders, and a liquid medium substantially completely filling the housing and constituting the working fluid for said pistons and cylinders.

11. A motion transmitting element comprising relatively oscillatable inner and outer members, the inner member comprising a center hub, the outer member comprising a housing surrounding the hub, and an outer plate portion rigid with the housing and adapted to have limited rotary movement therewith relative to the hub, coiled compression springs disposed in circumferentially spaced relation between the hub and housing to resist the relative rotary movement therebetween, an interfitting relatively reciprocable piston and cylinder constituting a fluid checking means cooperating with each of said springs to resist relative movement in one direction and retard return movement, and a ring inside the housing connected at circumferentially spaced points with said springs to prevent radially outward movement thereof under centrifugal force.

12. A motion transmitting element comprising relatively oscillatable inner and outer members, the inner member comprising a center hub, the outer member comprising a housing surrounding the hub, and an outer plate portion rigid with the housing and adapted to have limited rotary movement therewith relative to the hub, coiled compression springs disposed in circumferentially spaced relation between the hub and housing to resist the relative rotary movement therebetween, a liquid damping medium with which said housing is substantially filled surrounding the springs to absorb the sound incident to vibration thereof, an interfitting relatively reciprocable piston and cylinder constituting a fluid checking means cooperating with each of said springs and utilizing the liquid damping medium as its working fluid to resist relative movement in one direction and retard return movement by the discharge and intake of said liquid out of and into said cylinder, and a ring inside the housing connected at circumferentially spaced points with said springs to prevent radially outward movement thereof under centrifugal force.

13. A motion transmitting element comprising relatively oscillatable inner and outer members, the inner member comprising a center hub, the outer member comprising a housing surrounding the hub, and an outer plate portion rigid with the housing and adapted to have limited rotary movement therewith relative to the hub, coiled compression springs disposed in circumferentially spaced relation between the hub and housing to resist the relative rotary movement therebetween, and a ring inside the housing connected at circumferentially spaced points with said springs to prevent radially outward movement thereof under centrifugal force.

14. A motion transmitting element, comprising two concentric relative rotatable members having registering openings in circumferentially spaced relation about the axis of rotation, coiled compression springs seated in said openings to resist relative rotation between said members, and a ring disposed in substantially concentric relation with but separate from said members and free to float radially with respect thereto and connected at circumferentially spaced points with the middle portions of said springs, so as to retain all of said springs against radially outward movement under centrifugal force without otherwise interfering with the relatively free compression and expansion of said springs in the relative rotation between said members.

15. A motion transmitting element, comprising two concentric relatively rotatable members having registering openings in circumferentially spaced relation about the axis of rotation, coiled compression springs seated in said openings to resist relative rotation between said members, and two interconnected rings in substantially concentric relation with but separate from said members and disposed on opposite sides thereof having freedom to float radially with respect thereto but not axially, said rings being connected at circumferentially spaced points with the middle portions of said springs so as to retain all of said springs against lateral displacement from the openings and against radially outward movement under centrifugal force without otherwise interfering with the relatively free compression and expansion of said springs in the relative rotation between said members.

16. A motion transmitting element, comprising relatively oscillatable inner and outer members, the inner member comprising a center hub, the outer member comprising a housing surrounding the hub, and an outer plate portion rigid with the housing and adapted to have limited rotary movement therewith relative to the hub, coiled compression springs disposed in circumferentially spaced relation between the hub and housing to resist the relative rotary movement therebetween, an interfitting relatively reciprocable piston and cylinder constituting a fluid checking means cooperating with each of said springs to resist relative movement in one direction and retard return movement, and a ring inside the housing in substantially concentric relation therewith but separate therefrom and free to float radially with respect thereto, said ring being connected at circumferentially spaced points with the middle portions of said springs so as to retain all of said springs against radially outward movement under centrifugal force without otherwise interfering with the relatively free compression and expansion of said springs in the relative rotation between said members.

17. A motion transmitting element comprising relatively oscillatable inner and outer members, the inner member comprising a center hub, the outer member comprising a housing surrounding the hub, and an outer plate portion rigid with the housing and adapted to have limited rotary movement therewith relative to the hub, coiled compression springs disposed in circumferentially spaced relation between the hub and housing to resist the relative rotary movement therebetween, and a ring inside the housing in substantially concentric relation therewith but separate therefrom and free to float radially with respect thereto, said ring being connected at circumferentially spaced points with the middle portions of said springs so as to retain all of said springs against radially outward movement under centrifugal force without otherwise interfering with the relatively free compression and expansion of said springs in the relative rotation between said members.

W. VINCENT THELANDER.